United States Patent
Vonlanthen

(10) Patent No.: US 6,523,377 B1
(45) Date of Patent: Feb. 25, 2003

(54) BLOCKING DEVICE FOR A CYLINDER LOCK

(75) Inventor: Benno Vonlanthen, Zollikofen (CH)

(73) Assignee: Berchtold AG, Zollikofen (CH)

( * ) Notice: Subject to any disclaimer, the term of this patent is extended or adjusted under 35 U.S.C. 154(b) by 0 days.

(21) Appl. No.: 10/069,698

(22) PCT Filed: Aug. 10, 2000

(86) PCT No.: PCT/CH00/00429
§ 371 (c)(1),
(2), (4) Date: Feb. 21, 2002

(87) PCT Pub. No.: WO01/21913
PCT Pub. Date: Mar. 29, 2001

(30) Foreign Application Priority Data

Dec. 9, 1999 (CH) .............................. 1730/99

(51) Int. Cl.⁷ .............................. E05B 47/06
(52) U.S. Cl. .................. 70/278.3; 70/278.7; 70/283.1
(58) Field of Search ................. 70/278.2, 278.3, 70/278.7, 279.1, 283, 283.1, 278.6

(56) References Cited

U.S. PATENT DOCUMENTS

| | | | | |
|---|---|---|---|---|
| 5,542,274 A | * | 8/1996 | Thordmark et al. | 70/495 |
| 5,640,863 A | * | 6/1997 | Frolov | 70/283 |
| 5,699,686 A | * | 12/1997 | Neumayer et al. | 70/283 |
| 5,715,715 A | * | 2/1998 | Nunez | 70/283 |
| 5,782,118 A | * | 7/1998 | Chamberlain et al. | 70/279.1 |
| 6,363,762 B1 | * | 4/2002 | Kueng | 70/278.3 |

FOREIGN PATENT DOCUMENTS

| | | | |
|---|---|---|---|
| DE | 4404914 | * | 8/1995 |
| WO | WO98/28508 | * | 7/1998 |

* cited by examiner

Primary Examiner—Lloyd A. Gail
(74) Attorney, Agent, or Firm—Notaro & Michalos P.C.

(57) ABSTRACT

The blocking device is intended for a cylinder lock (1) with mechanically coded tumblers and an electric coding. An installation unit (22) comprises an electrically driven control (14) with a helical drive unit (16). The helical drive unit (16) is connected with an additional blocking element (13), which can engage and disengage the rotor (10) of the cylinder lock (1). The helical drive unit (16) comprises a threaded track (39, 61, 65) closed at both ends. A control device (17) generates the control signals for the driving or the energy supply to the control (14). The method of construction according to the invention makes possible a compact type of construction and has improved security against unauthorized interference from the outside.

15 Claims, 5 Drawing Sheets

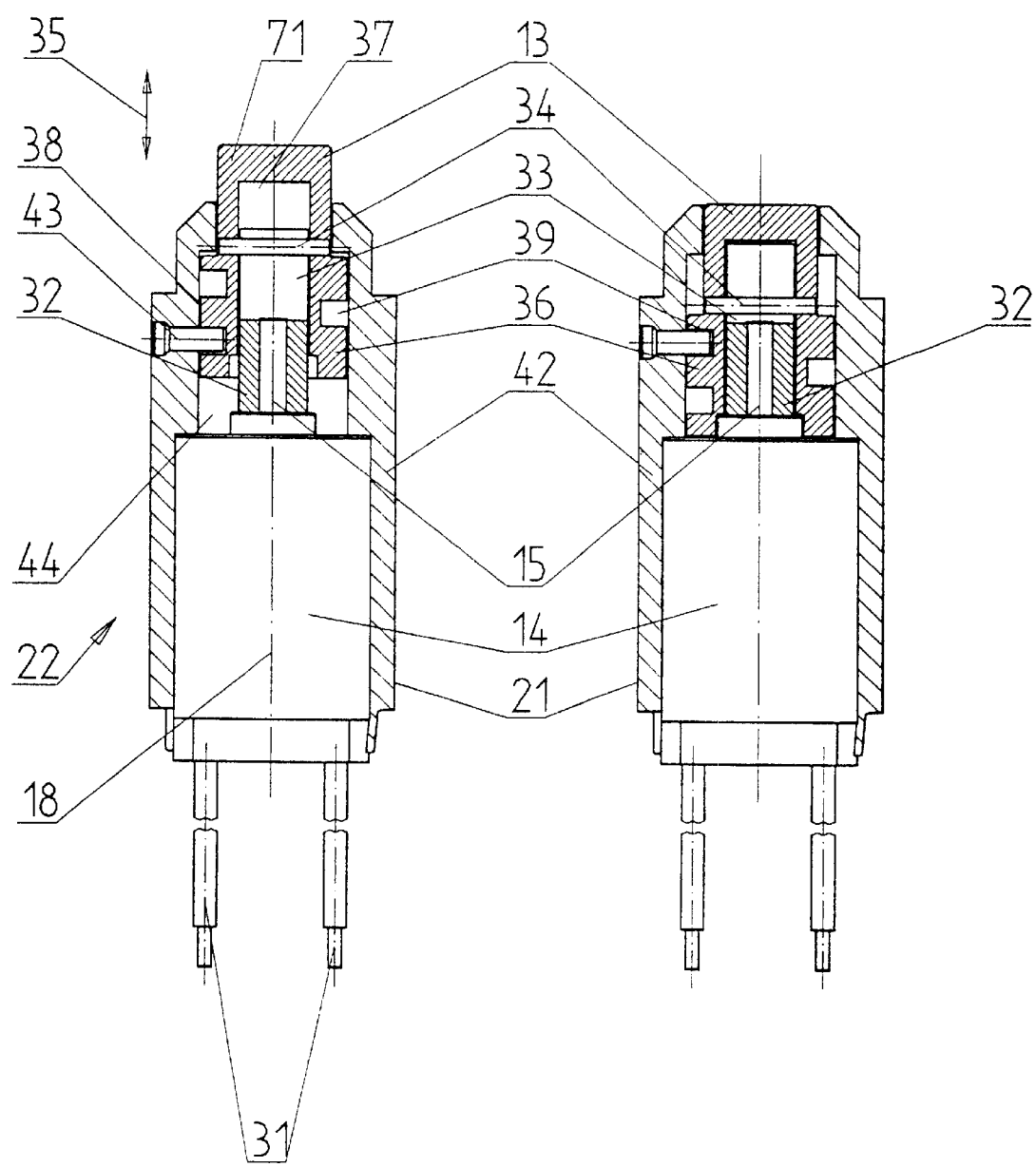

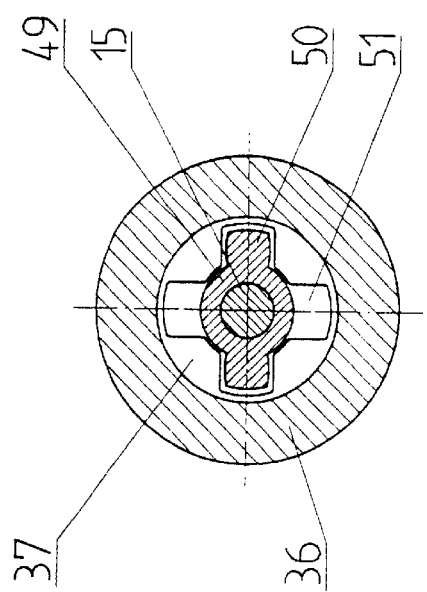
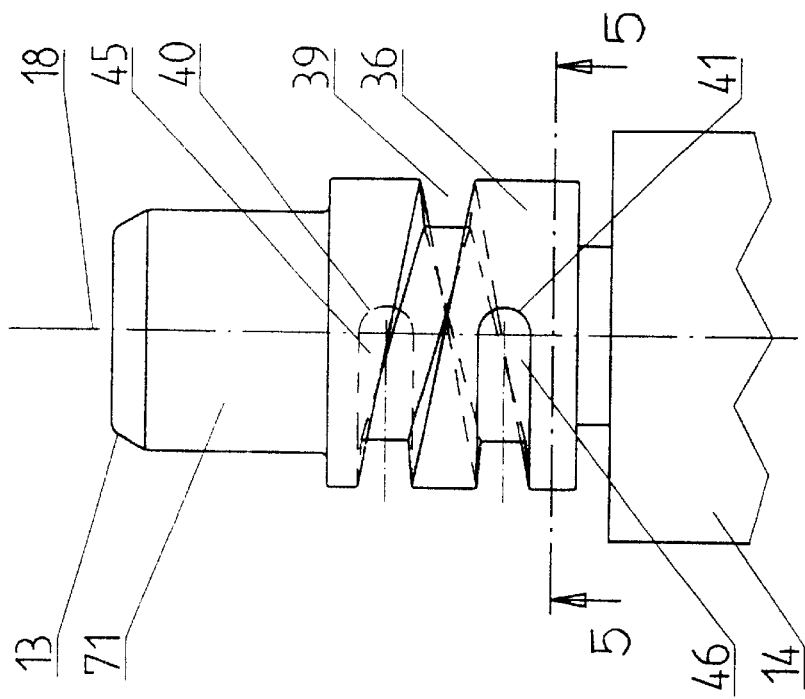

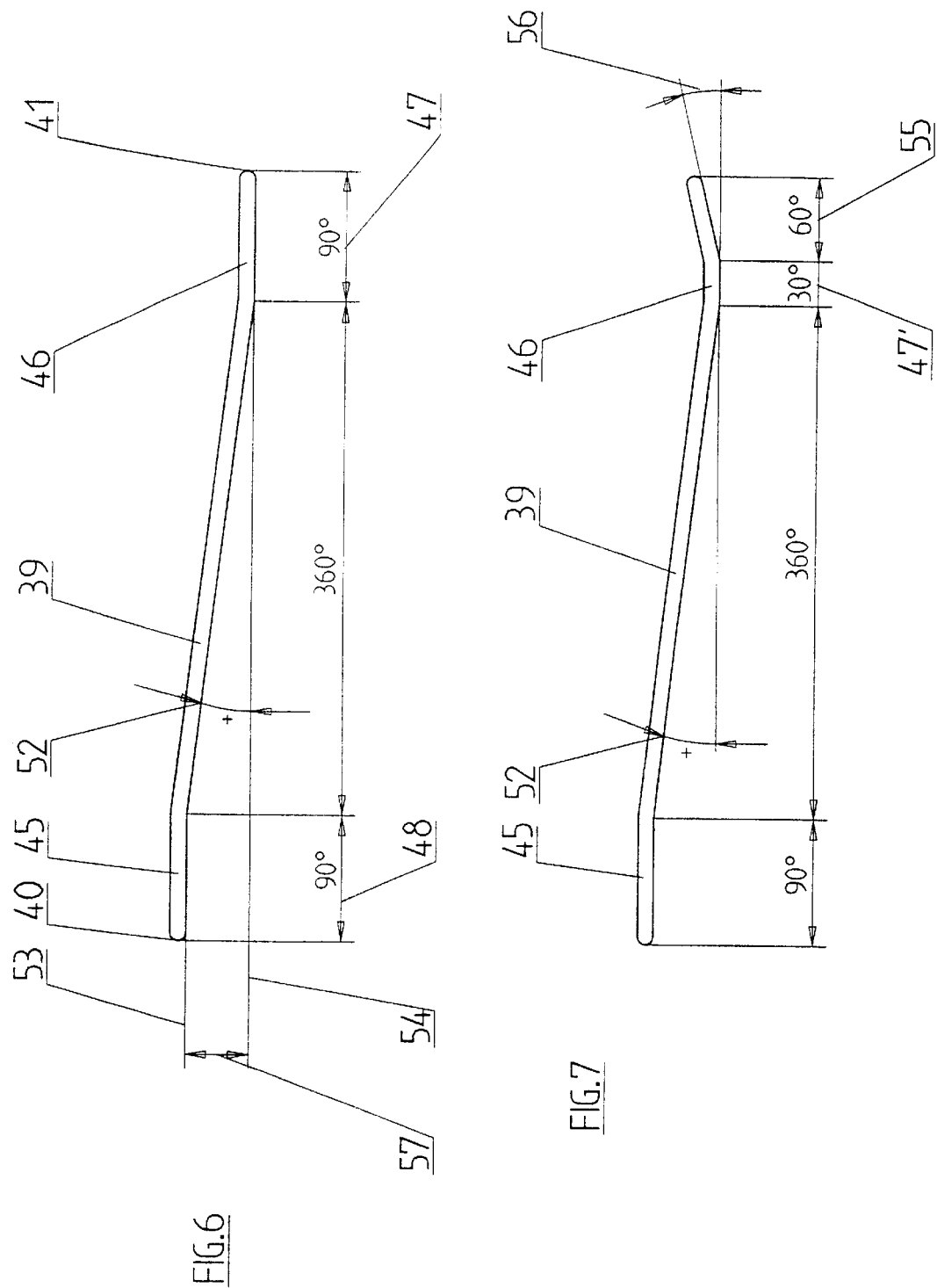

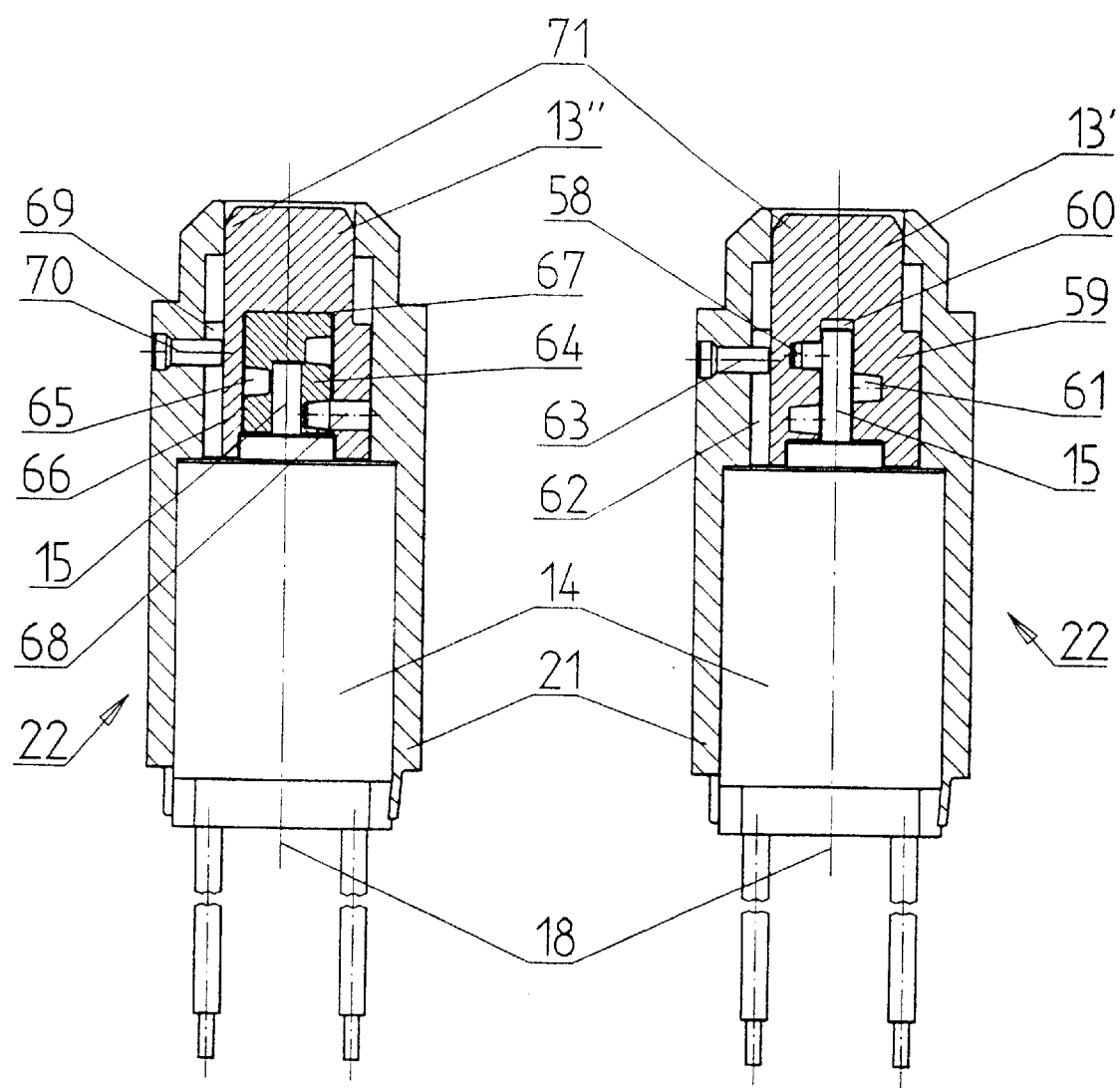

BLOCKING DEVICE FOR A CYLINDER LOCK

BACKGROUND OF THE INVENTION

The invention relates to a blocking device for a cylinder lock with a stator, a rotor rotatable in this stator by means of a key, an additional blocking element which can linearly engage and disengage the rotor along a displacement axis, and an electrically driven control means for actuating this blocking element, with the control means comprising a rotating driven end of the shaft, a helical drive unit, which is disposed between the control means and the blocking element, as well as an electric control device for generating control signals for the control means and a method for operating this device.

Blocking devices of this type are applied in locks, in particular in cylinder locks. In the case of cylinder locks it is known to provide mechanically coded tumblers between rotor and stator and additionally a mechatronic blocking device which blocks the rotor independently of the mechanically coded tumblers. Through this combination of mechanically coded tumblers with an electric or electronic coding, the security and adaptability of such locks or locking devices can be considerably increased. Such locking configuration is known for example from EP A 730 073. This locking device comprises in known manner a rotatable rotor, wherein this rotor is provided with a key channel, into which a flat key can be inserted. This flat key comprises on the key bit in a manner known per se mechanical codings, which cooperate with tumblers between rotor and stator. With the correct coding of the key, these mechanical tumblers can be unblocked and thus the mechanical portion of the locking device can be moved into the opening position. The key comprises additionally an electronic coding, which, in this example, includes a transmitter for information signals. As a counterpiece on the cylinder lock a receiver is disposed which receives the information signals transmitted from the key and supplies them to an electronic processing device. This electronic device controls an additional electromechanical latch whose blocking part can engage and disengage the rotor. This electromechanical latch comprises an actuation component or a control means for the blocking part. The control means can be known means for generating translational motions, for a example a magnetic drive or a rotating setting drive. In order to hold the blocking part in the blocking position and to secure it against unauthorized interference from the outside, a reset spring is available which presses the blocking part in the direction of the rotor. This is especially necessary in the case of blocking parts which are moved translationally by solenoid magnets, since here in the de-energized condition the control means does not exert any forces onto the blocking part.

The above described and further known locking devices with cylinder locks, which comprise, on the one hand, a purely mechanical coding and, on the other hand, an electronic coding with additional mechanical blocking elements, for their orderly actuation or unblocking, a mechanically correctly coded key and an electronic module on the key, which exchanges information signals or data with an electronic module in the cylinder lock. This data exchange can take place through direct contact elements or free of contact via a transmitter-receiver system. If the electronic module on the key contains the correct data, the electronic module in the cylinder lock accepts this key as being authorized for opening and releases the additional blocking device. In spite of this twofold coding and increased security, the known electromechanical or mechatronic locking devices which can still be interfered with sufficient expenditure through magnetic forces, vibration or impacts or by combinations thereof.

In borderline cases this can lead to the fact that such a locking device can also be opened without authorization without keys with matching electronic coding. Of disadvantage with locking devices with cylinder locks of this type and with an additional electronically controlled blocking element is also the fact that the additional blocking element and the corresponding control means, have dimensions, in particular with the actuation by a solenoid magnet which are greater than the normal housing of commercial cylinder locks. Therefore additional housings are necessary and the corresponding locking devices cannot be applied in standardized, normally utilized lock boxes on doors or other objects. In order to make installation possible additional adaptations and changes are necessary.

In the mechanical coded cylinder locks, which are used for example with rotary grip locks or cylinder olive-shaped handles for rotary rod locks, it is known that the structural dimensions can be reduced if the blocking element is actuated via a helical drive unit. These known actuations of blocking elements through helical driving however, are not able to solve the problem of unauthorized unlatching by actions from the outside. WO 98/28508 discloses a solution which essentially employs an additional electromechanical latch, such as is described in EP A 730 073, in which inter alia for generating the movement of the blocking element a control means with different types of helical driving is proposed. In order to counteract unauthorized interference from the outside onto the blocking element, additionally reset means and/or force transmission means are necessary, which are said to counteract or neutralize forces potentially applied from the outside. These reset and force transmission means are essentially disposed on the control means approximately at right angles to the longitudinal axis of the threaded drive, whereby either radially or parallel to the longitudinal axis of the cylinder lock additional space is required. This device can therefore also not be installed into the housing of normal cylinder locks, but rather additional annular housing or longitudinal housing components are necessary.

Due to the large number of requisite parts and their differing axes of action, the assembly and installation of this blocking device is complicated and costly and often requires additional adaptations in the installation region into an object, for example into a lock box and/or a door.

The present invention addresses the problem of providing a blocking device for a cylinder lock with an additional mechatronic blocking device in which this additional blocking device can be installed into a standard lock housing, for example into its crosspiece, simultaneously the unauthorized unblocking through interference from the outside is virtually prevented and the additional blocking device is structured as a compact structural unit in simple manner and with a minimum number of parts. The additional blocking device for a cylinder lock is furthermore developed as a kit which makes possible the retrofitting of mechanically coded cylinder locks and it will, moreover, be applicable in different systems of cylinder locks.

This problem is solved in terms of device through the characteristics defined in the characterizing clause of patent claim 1 and in terms of method according to the characteristics of the independent method claim. Advantageous further developments of the invention are evident based on the characteristics of the dependent patent claims.

In the blocking device according to the invention the driven end of the shaft of the control means, the rotational axis of the helical drive unit, as well as the blocking element and its linear guidance are disposed on a common longitudinal axis, or these elements have a common axis. This disposition yields the advantage that these elements can be combined to form a compact structural unit and a simplified method of construction is made possible. Due to the orientation of the rotational axis of the helical drive unit toward the common longitudinal axis, the rotary motion of the driven end of the shaft of the control means can be converted directly into the linear motion of the blocking element without additional elements, such as reset means of force transmission means being necessary.

The helical groove which is disposed on a first portion of the helical drive unit, along a shell surface about the common longitudinal axis, has a positive pitch over a certain predetermined segment and forms therewith a coil-form ramp, similar to a threaded worm. The helical groove has a certain length, which with the pitch determines the linear stroke travel of the helical driving. The two end regions of the helical groove are terminated by stop faces and determine, on the one hand, the blocking position of the blocking element and, on the other hand, the opening position of the blocking element. In the blocking position the blocking element has engaged into the rotor and blocks it relative to the stator. In the opening position the blocking element does not extend into the rotor and is disengaged from it. At least at that end region of the helical groove, which determines the blocking position of the blocking element, an additional longitudinal element of the blocking groove is disposed which exhibits no pitch. This longitudinal element without pitch is in a radial plane with respect to the longitudinal axis. A slide element disposed on a second portion of the helical drive unit, which engages the helical groove, in this region of the helical groove without pitch is form-fittingly and without action of force held in the direction of the common longitudinal axis. In connection with the characteristic that either the first portion of the helical drive unit with the helical groove or the second portion of the helical drive unit with the slide element is fixedly connected with the blocking element, the advantage is obtained that the blocking element in this end region of the helical groove, i.e. in the blocking position, is also held form-fittingly and without action of force. Usefully, the second end region of the helical groove is also provided with an additional longitudinal element, which does not have a pitch. Thereby the advantage is attained that in both end positions of the helical driving the blocking element is held through an operative connection between the helical groove and the slide element, which cannot be affected through external interference from the outside. In this implementation of the blocking device, such external interference such as magnetic forces, vibrations, impacts or resonance oscillations cannot displace the blocking element from the blocking or opening position. Unauthorized actuations of the blocking device are therefore virtually impossible. If on an end region of the helical groove with positive pitch or at a longitudinal element of the helical groove without pitch, an additional longitudinal element of the helical groove with negative pitch is annexed, an additional improvement of the security results since in this case, for example during an unauthorized attempt to displace the blocking element from the blocking position into the opening position, first an oppositely directed motion would have to be generated. The linear displacement travel of the blocking element from the blocking position into the opening position, and conversely, can be adapted in extremely simple manner by changing the length and/or the pitch of the helical groove to the desired conditions. Due to the direct coupling between helical drive unit and blocking element, the stroke travel of the helical driving corresponds to the linear displacement travel of the blocking element. Since at least in the blocking position no additional holding and reset forces act onto the blocking element, this end position is determined only by the forced guidance of the slide element in the helical groove and is uniquely determined by the form-fitting holding.

The blocking device according to the invention has further advantages since the elements of the helical drive unit and their connection to the blocking element, on the one hand, and to the driven end of the shaft of the control means, on the other hand, can be implemented differently. In a first advantageous implementation, the first portion of the helical drive unit is developed on the driven end of the shaft and specifically through a cylindrical structural part, in whose outer shell surface the helical groove is disposed. The second portion of the helical drive unit is formed by an end portion on the blocking element with an inner bore, wherein the slide element is disposed on the shell of this inner bore and projects radially into the bore. The cylindrical structural part on the driven end of the shaft extends into the inner bore at the end portion of the blocking element and is guided in this bore. The slide element extends therein into the helical groove on the outer shell of the cylindrical structural part and cooperates with it. The cylindrical structural part is connected torsion-tight with the driven end of the shaft of the control means and with rotational motions of the driven end of the shaft about the common longitudinal axis the cylindrical structural part is also rotated, whereby the slide element, and therewith the blocking element, is linearly displaced in the direction of the common longitudinal axis. The end portion of the blocking element is for this purpose secured against twisting in a manner known per se such that between the first and the second portion of the helical drive unit the desired conversion of the rotary motion into a linear motion takes place. A further embodiment of the helical drive unit comprises that the second portion of the helical drive unit is formed by the driven end of the shaft of the control means, wherein the slide element is fastened on this driven end of the shaft and projects radially outwardly. The blocking element also comprises an end portion with an inner bore, with the helical groove being formed into the shell surface of this inner bore. The end portion of the blocking element is slid over the driven end of the shaft and between the shell surface of the inner bore and the outer shell of the driven end of the shaft is formed a slide guidance. The slide element engages the helical groove and with rotational motions of the driven end of the shaft the blocking element is displaced through the cooperation of slide element and helical groove linearly in the direction of the common longitudinal axis. Here also the end portion of the blocking element is secured against twisting about the common longitudinal axis so that the conversion of the rotational motion on the control means into linear motions of the blocking means is ensured. In an especially advantageous development of the threaded drive, the blocking element is developed with an end portion which has a core bore and on whose outer shell surface the helical groove is disposed. Between the core bore of the end portion on the blocking element and the driven end of the shaft of the control means a slide groove connection is developed wherein, for example the driven end of the shaft is developed as a key shaft and on the shell surface of the core bore corresponding grooves are formed out at the end portion. This slide groove connection between blocking element and driven end of the shaft permits the transmission of the rotational motion of the driven end of the shaft onto the blocking element and simultaneously the linear displacement of the blocking element in the direction of the common longitudinal axis. The end portion of the blocking element is guided in a stationary sleeve with the slide element being disposed on the inner shell of this sleeve, which element projects radially into the bore of the sleeve and extends into the helical groove on the outer shell of the end portion of the blocking element. In this embodiment the sleeve and the slide element form the second portion of the helical drive unit and the end portion of the blocking element with the slide groove connection the first portion of the helical drive unit. This embodiment has the advantage that the sleeve can be developed simultaneously as the outer housing for the entire structural unit, which comprises the control means with the driven end of the shaft, the helical drive unit and the blocking element. This makes possible the preassemble of the structural unit, which can be placed as an overall unit into a corresponding bore on the cylinder lock and in simple manner can be connected with the electric lines.

The compact type of construction of the structural unit which is formed by the control means, the helical drive unit and the blocking element, and their orientation on a common longitudinal axis permits the installation of the blocking device into the crosspiece of a cylinder lock with the conventional structural dimensions. The outer form of the housing of the cylinder lock is therein retained and the cylinder lock with the additional blocking device according to the invention can be installed into the customary installation openings on installation objects, for example a lock box. This leads to considerable simplification since, on the one hand, a cylinder lock with the blocking device according to the invention can be completely set up and produced functionally ready at the factory and, on the other hand, no additional measures are any longer necessary when mounting it at the construction site. With the disposition of the blocking device according to the invention in the crosspiece of a cylinder lock, the common longitudinal axis is oriented approximately radially with respect to the rotational axis of the rotor. On the front portion of the blocking element a blocking pin is disposed and this blocking pin in the blocking position of the cylinder lock extends into an approximately radial bore on the rotor. Since in the proximity of the crosspiece between rotor and stator normally no mechanical tumblers are disposed, the radial bore in the rotor for the extension of the blocking pin on the blocking element can readily be disposed in this region. This can be done without mechanical tumblers needing to be omitted or their function needing to be restricted. The blocking device according to the invention is thus independent within in a broad range from the system of the mechanically coded mechanical tumblers, i.e. the blocking device according to the invention can be combined with different types of construction of cylinder locks. This is made possible since all cylinder locks correspond to an industry standard and have a crosspiece projecting radially from the stator outwardly, which serves among others for the torsion-tight fastening of the cylinder lock in the structural object, for example a lock box.

The advantages of the method for operating the blocking device according to the invention comprises that the rotational motions of the driven end of the shaft of the control means can be directly converted into linear motions of the blocking means in the direction of the longitudinal axis and that onto the blocking element during the displacement process from the blocking into the opening position, and conversely, as well as in the holding positions no additional holding and/or resetting forces are exerted. This has the further advantage that the motion sequence and the method for generating the motions of the blocking element on the part of the blocking device are relatively simple and nevertheless an intervention into the motion sequence by additional forces exerted without authorization from the outside becomes virtually impossible. In displacing the blocking element into the blocking position or into the opening position it is advantageous to stop the rotational motion of the driven end of the shaft with the aid of final stops on the helical drive unit when these end positions have been reached. The stopping or the standing still of the driven end of the shaft is electronically detected via the control device and after the passage of a predetermined control time, the energy supply to the control means is interrupted. This control method has the advantage that the control means which drives the helical drive unit via the driven end of the shaft does not need to be stopped with the aid of an electronic position control, but rather the position of the helical driving controls the interruption and/or the enabling of the energy supply to the control means. The control means is advantageously supplied with energy intermittently or pulsatingly during the activated time interval. Therewith, multiple utilization and optimization of the energy source, for example of a battery, is possible, especially if the entire length of the energy supply is determined by the control device. The activation of the control device, and thus the type and manner of the enabling of the energy supply to the control means with the driven end of the shaft is activated by information signals which are transmitted from a mobile information medium to the cylinder lock. The transmission of the information or data, can advantageously take place directly via contact elements or via a contact-free transmitter-receiver system. The mobile information medium can be, for example, a key with an electronic data medium or an identification card with a corresponding data medium. In the cylinder lock or in the associated lock box an electronic data processing unit is installed as a counterpiece, which exchanges the data with the mobile information medium via direct contacts or a contact-free transmitter-receiver system, for example a radio system.

BRIEF DESCRIPTION OF THE DRAWINGS

In the following the invention will be explained in further detail in conjunction with embodiment examples with reference to the attached drawings. Therein depict.

DETAILED DESCRIPTION OF THE PREFERRED EMBODIMENT

Figure 1:
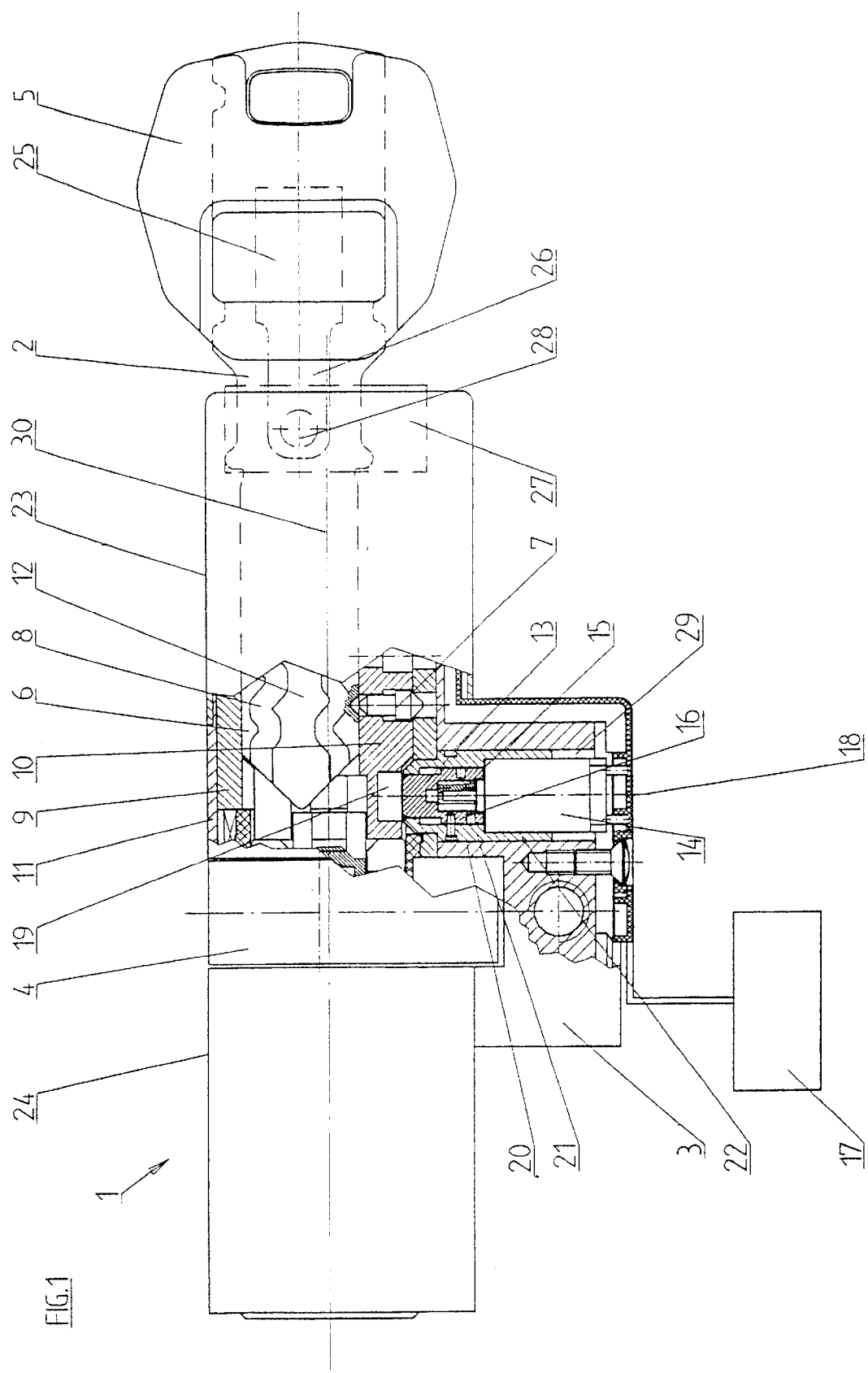
FIG. 1 a double cylinder lock with a partial section through the region with the additional blocking element, FIG. 2 a section through an installation unit with control means, helical drive unit and additional blocking element in the blocking position, FIG. 3 an installation unit according to FIG. 2 with the additional blocking element in the opening position, FIG. 4 a detail representation of a first portion of the helical drive unit with the helical groove and the blocking element connected therewith, FIG. 5 a cross section through the first portion of the helical drive unit along line 5—5 in FIG. 4, FIG. 6 a devolution of a helical groove on a first portion of the helical drive unit in schematic representation, FIG. 7 a devolution of a helical groove of a first portion of the helical drive unit in schematic representation with an end region with negative pitch, FIG. 8 a second embodiment of an installation unit with an additional blocking element and a different implementation of the threaded drive, and FIG. 9 a further embodiment of an installation unit with the additional blocking element and a further embodiment of the helical drive unit.

In FIG. 1 a cylinder lock 1 with a blocking device according to the invention is shown, with this being a double cylinder lock with two lock cylinders 23, 24. These two lock cylinders 23, 24 are fixedly connected with one another via a crosspiece 3 in a manner known per se and disposed such that an interspace is formed between them in which, in a manner also known, an engagement piece 4 is disposed for actuating (not shown) locking elements. Each of the two locking cylinders 23, 24 of the cylinder lock 1 comprises a mechanically coded blocking system, which is developed for example according to Swiss Patent No. 407 799 and comprises a housing 11, a stator 9 and a rotor 10 rotatable in this stator 9 by means of a key 2. The depicted key 2 comprises at its key bit 6 as well as on the broad sides grooves 8 with codings for (not shown) tumblers, as well as also on the narrow sides for the so-called edge tumblers 7. With a fitting key 2, which has the correct codings on the broad sides and on the narrow sides of the key bit 6, the blocking tumblers can be moved into the opening position and therewith the mechanical portion of the cylinder lock 1 can be unlatched. In spite of the great complexity of the mechanical codings 7, 8 on key 2 it is possible to copy these with suitable machine tools and without authorization to fabricate copies of the keys which make possible the unblocking of the mechanically coded portion of the cylinder lock 1. In order to prevent the opening of the cylinder lock 1 with a key whose mechanical portion has been copied, the depicted cylinder lock 1 is provided with an additional electronic coding. For this purpose, into the bow 5 of key 2 an electronic structural element 25 is installed on which an electronic coding is stored.

This electronic module or electronic structural element 25 is connected with a conducting leader 26 which, when the key 2 is completely inserted into the cylinder lock 1, cooperates with a transmission unit 27 on the cylinder lock 1. In the depicted example the transmission unit 27 has available electric contacts 28 which are resiliently pressed onto the leader 26 and establish a conducting connection between the transmission unit 27 and the electronic structural element 25. In this way data can be exchanged between the key 2 and the cylinder lock 1. With corresponding implementation of the key 2, or of the cylinder lock 1, the data exchange can take place even without hard-wired contacts, for example by radio transmission. The transmission unit 27 is connected with an electronic control device 17, with this connection not being depicted. This electronic control device 17 comprises a computer which, depending on the installed hardware and software, can detect whether or not the key 2 with the electronic structural element 25 inserted into the cylinder lock 1 is an original key or whether or not other conditions are met, such as for example opening authorization for the cylinder lock 1 in a certain time range. Connected with this electronic control device 17 is an additional blocking device which is independent of the mechanical coding of the lock-key combination and comprises an additional blocking element 13 which can engage and disengage the rotor 10. The additional blocking element 13 is part of an installation unit 22, which is installed in a bore 29 in crosspiece 3. This installation unit 22 comprises a control means 14, in the described example a micrometer with rotating driven end of the shaft 15, a helical drive unit 16 and a linear guidance 20 for the additional blocking element 13, as well as a housing 21, which encompasses these components. The control means 14, the driven end of the shaft 15, the helical drive unit 16 and the additional blocking element 13, or their longitudinal axes, are all on a common longitudinal axis 18. This common longitudinal axis 18 is directed at approximately right angles with respect to the rotational axis 30 of rotor 10. Via the electronic control device 17 the energy supply from a (not shown) energy source, to the micrometer or control means 14 is controlled. The rotary motions generated by micrometer or control means 14, of the driven end of the shaft 15 are converted via the helical drive unit 16 into linear motions of the additional blocking element 13. These linear motions of the additional blocking element 13 are directed on the common longitudinal axis 18 and in the extension of this axis 18 a radial bore 19 is disposed in rotor 10, in or from which the blocking element 13 can engage or disengage. For this purpose on blocking element 13 is disposed a front portion in the form of a blocking pin 71, which in the blocking position of the cylinder lock 1 extends into the bore 19 on rotor 10 and prevents therewith rotary motions of rotor 10 in stator 9. And it does so even if the mechanical tumblers actuated by the mechanical codes on key 2 are in the opening position. The additional blocking element 13 can only be retracted from the blocking position in bore 19 on rotor 10 into the opening position if a corresponding control command from the electronic control device 17 enables the energy supply to the control means 14 such that the rotating part of the helical drive unit 16 rotates in the correct direction. The corresponding control commands of the electronic control 17 are only generated if from the electronic structural element 25 on key 2 the correct electronic coding can be read and simultaneously at the time of the opening attempt this key 2 is also authorized for opening. The electronic coding data in the electronic structural element 25 on key 2 are encrypted such that they cannot be copied. It is also not possible to bring the additional blocking element 13 through external interference from the outside, for example through magnetic forces, by vibrating, application of oscillations, impacts etc. out of the blocking position into an opening position. This is ensured through the implementation according to the invention of the helical drive unit 16 and the disposition according to the invention of the structural elements in the installation unit 22, which forms the blocking unit. This very high security against actuation attempts of the additional blocking element 13 through external interference from the outside is attained, on the one hand, by the absence of holding or resetting forces acting additionally onto the blocking element 13, and, on the other hand, through the forming according to the invention of the helical drive unit and the disposition of all actuation elements contiguously with the additional blocking element 13 on the common longitudinal axis 18. The installation unit 22 with the additional blocking element 13 can be built highly compactly due to the forming according to the invention and the length can be reduced so far that installation into the crosspiece 3 of a cylinder lock 1 with normal structural dimensions is possible. The outside dimensions of the cylinder lock 1 are therefore of a size equal to a cylinder lock only mechanically coded with the exception that the length in the direction of the rotational axis 30 is greater in order to permit installation of the transmission unit 27. This permits the installation of a cylinder lock with the blocking device according to the invention into lock boxes and other structural elements with the standardized cutouts for commercial cylinder locks.

FIGS. 2 and 3 show an installation unit 22 in enlarged representation and in longitudinal section, and in Figure the blocking element 13 is depicted in the blocking position and in FIG. 3 in the opening position. At the lower end of the control means, or micrometer 14, electric leaders 31 are disposed which serve for the control and power supply and are connected with the electronic control device 17. At the upper end of the control means 14 is located the driven end of the shaft 15 which can rotate about the longitudinal axis 18 in both directions of rotation. On the driven end of shaft 15 a coupling member 32 is fastened so as to be torsion-tight, with this coupling member 32 comprising at the upper end a longitudinal groove 33, which forms an inner element of a slide groove joint. As a counter piece of this slide groove joint is disposed on the blocking element 13 a transverse bolt 34 which engages the groove 33 on the coupling member 32. This transverse bolt 34 forms an outer element of the slide groove joint between the blocking element 13 and the driven end of the shaft 15 or the coupling member 32. Through this slide groove joint 33, 34 the rotary motions of the driven end of the shaft 15, or of the coupling member 32 are transmitted to the blocking element 13. But simultaneously the blocking element 13 can become displaced in the direction of the longitudinal axis 18 linearly in the direction of arrow 35. On blocking element 13 is disposed an end portion 36 which has a core bore 37. Between this core bore 37 in end portion 36, or in the blocking element 13 and the coupling member 32 a slide guidance is developed. On the outer shell 38 of the end portion 36 of blocking element 13 a helical groove 39 is disposed. This end portion 36 with the helical groove 39 forms a first portion of the helical drive 16. From bottom to top this helical groove 39 is coiled with a positive pitch over 360° about the end portion 36 and comprises at the lower and upper end stop faces 40 and 41, which terminate the helical groove 39, as is shown in FIG. 4. A second portion of the helical drive unit 16 is formed by a slide element 43 in the form of a pin and a sleeve 42, which is a part of the housing 21. The slide element 43 is connected with the sleeve 42 and projects radially into the bore 44 of sleeve 42. The portion projecting into the bore 44, of the slide element 43 engages the groove 39 at the end portion 36 of the blocking element 13. Sleeve 42 is a component of housing 21, which encompasses the control means 14, the helical drive unit 16 and a portion of the blocking element 13. Housing 21, as evident in FIG. 1, is fastened torsion-tight in the bore 29 on crosspiece 3 of the cylinder lock 1. In the embodiment example depicted in FIGS. 2 and 3 of the installation unit 22 thus the control means 14 and its driven end of the shaft 15 and housing 21 with slide element 43 are stationary. If the end portion 36 of blocking element 13 is set into rotation via the driven end of the shaft 15 and the slide groove joint 33, 34, the blocking element 13, due to the relative motion between the slide element 43 and the helical groove 39, is displaced linearly in the direction of arrow 35. Thereby the blocking element 13 can be displaced in the direction of the longitudinal axis 18 linearly from the blocking position depicted in FIG. 2 into the opening position depicted in FIG. 3 and conversely. In the blocking position the blocking pin 71 on the front portion of blocking element 13 is driven out of housing 21. In FIGS. 4, 5, and 7 the forming according to the invention of the helical groove 39 is evident. One of the end regions 45, 46 of the helical groove 39 is assigned to the opening position or blocking position of blocking element 13. At least on the end region 46 of helical groove 39, which is assigned to the blocking position, an additional longitudinal element 47 of the groove is disposed which does not have a pitch. As is evident in FIG. 4, in the example shown, on end region 45 of helical groove 39 is also disposed an additional longitudinal element 48 without pitch. If the slide element 43 is in the blocking or opening position of blocking element 13 in one of the two longitudinal elements 47, 48 without pitch of the helical groove 39, it is held form-fittingly and without additional holding or resetting forces. This relative position between slide element 43 and end portion 36 of blocking element 13 without actuation of the control means 14 can virtually not be changed. Attempts through external interference, such as vibrations and the like, to disengage or engage the blocking element 13 from or into the blocking or opening position, therefore fail completely. Thereby the security of the blocking device is substantially increased and it is virtually impossible to actuate the cylinder lock 1 without mechanically and electronically correctly coded key 2. In order to avoid damaging the control means 14 the current and/or voltage variation is monitored through the electronic control device 17 and processed by a control program. If the slide element 43 abuts one of the two stop faces 40 or 41 of helical groove 39, the thereby generated changes of current and/or voltage on the control means 14 are determined and after a certain length of time has passed, the energy supply is interrupted. But it is also possible to detect via the control program predetermined control times and to interrupt the energy supply to the control means 14 after the passage of the control time. The supply of energy to the control means 14 takes place intermittently. This leads to very simple solutions and limit switches or position controls, such as are required in other cases, can be completely avoided. The resting mass of control means 14 and of helical drive unit 16 as well as the motion deflection within helical drive unit 16 ensure a secure positioning of the slide element 43 in the two end regions 45 and 46 of helical groove 39 even with de-energized control means 14.

FIG. 5 shows a cross section along line 5—5 through the end portion 36 in FIG. 4. The slide groove connection between driven end of the shaft 15 and end portion 36 of the blocking element 13 are evident, with here a further embodiment being shown which differs from the embodiment according to FIGS. 2 and 3. On the driven end of the shaft 15 a coupling member 49 is fastened so as to be torsion tight, which comprises two keys 50 directed radially outwardly and offset by 180° with respect to one another. In the core bore 37 of end portion 36 or blocking part 13 are disposed four longitudinally directed keyways 51 each offset by 90° into which the keys 50 extend form-fittingly and slidingly. This implementation of the slide groove joint 50, 51 permits a simpler positioning of the blocking element 13 on the coupling member 32 or on the driven end of the shaft 15 during the assembly. If required, the slide groove joint can also be developed with a polygonal connection.

FIG. 6 shows a schematic representation of the formation of the helical groove 39 on the first portion 36 of the helical drive unit 16. The depicted devolution corresponds to the configuration according to FIG. 4. The helical groove 39 comprises a stroke region with a positive pitch 52 with end regions 45 and 46. End region 45 is therein located on an upper position plane 53 and end region 46 on a lower position plane 54. The stroke difference between these two position planes 53, 54 forms the stroke travel 57 and corresponds to the linear displacement travel of blocking element 13 from the blocking position into the opening position and conversely. The stroke range of the helical groove 39 according to this example extends over 360°, i.e. it corresponds to one convolution about end portion 36. The additional longitudinal elements 47 and 48 which in the end regions 46 and 45 adjoin the stroke range, do not have a pitch and extend over a rotational range of 90°.

These two additional longitudinal elements 47 and 48 of helical groove 39 without pitch are each in a radial plane with respect to longitudinal axis 18.

In FIG. 7 is shown an additional advantageous implementation of the helical groove 39 on at least one of end regions 45 or 46. Especially on the end region 46 of the helical groove 39 the additional longitudinal element 47' which does not have a pitch, is shortened and, instead, an additional longitudinal element 55 is added which has a negative pitch 56. Through this additional change of direction in the proximity of the blocking position the security against unauthorized interference is additionally further increased. The additional longitudinal element 47' without pitch can be shortened for example to a range of 30°, and the additional longitudinal element 55 with negative pitch 56 can extend, for example, over a range of 60°.

In FIG. 8 an installation unit 22 with a blocking element 13' is depicted, which comprises a second embodiment of a helical drive unit 16. On the driven end of the shaft 15 of control means 14 a slide element 58 in the form of a radial cam is fastened. On blocking element 13' an end portion 59 with an inner bore 60 is disposed. Into the wall of this inner bore 60 again a helical groove 61 is worked, which, with respect to pitch and stroke range as well as end regions is implemented identically to those described in connection with FIGS. 4, 6 and 7. Here also the end region 45 of helical groove 39 is associated to the opening position and end region 46 to the blocking position. The slide element 58, which is connected with the driven end of the shaft 15, extends into this helical groove 61 and is displaceable in it. On the outer shell of end portion 59 an anti-twist securement is disposed which comprises a longitudinal groove 62 in this outer shell and a guidance pin 63, which is fastened on housing 21 and extends into groove 62. The blocking element 13' and the end portion 59 connected therewith is only linearly displaceable in the direction of longitudinal axis 18 and can not be twisted about the longitudinal axis 18. Rotational motions of the driven end of the shaft 15 about the longitudinal axis 18 therefore effect through the relative motion between the slide element 58 and helical groove 61 linear motions of blocking element 13' in the direction of the longitudinal axis 18 and thus the desired displacement of blocking pin 71 from the blocking position into the opening position and conversely. In this embodiment the end portion 59 which is fixedly connected with blocking element 13', forms the first portion of helical drive unit 16. The second portion of helical drive unit 16 is formed by slide element 58 on the driven end of the shaft 15. The slide element 58 is movable relative to blocking element 13'.

The installation unit 22 depicted in FIG. 9 comprises a further embodiment of helical drive unit 16. In this embodiment on the driven end of the shaft 15 a cylindrical structural part 64 is fastened so as to be torsion-tight. Into the outer shell surface of this cylindrical structural part 64 is worked the helical groove 65. Form and implementation of this helical groove 65 correspond here also to the embodiment according to FIGS. 4, 6 and 7. However, in this structural variant the end region 47 of helical groove 39 is assigned to the opening position and the end region 45 to the blocking position. On blocking element 13" is again disposed an end portion 66 with an inner bore 67. Into this inner bore 67 extends the cylindrical structural part 64 and between the outer shell of this cylindrical structural part 64 and the inner bore 67 a slide guidance is formed. On the end portion 66 furthermore a slide element 68 in the form of a guidance pin is disposed, with this slide element 68 radially projecting into inner bore 67 and extending into helical groove 65 on the cylindrical structural part 64. Into the outer shell of end portion 66 again a longitudinal groove 69 is worked, into which extends a guidance pin 70 which is fastened on housing 21. This prevents the blocking element 13" or its end portion 66 to be twisted about longitudinal axis 18, however it is possible to displace the blocking element 13" linearly along this longitudinal axis 18. Rotational motions of the driven end of the shaft 15 or of the cylindrical structural part 64 about the longitudinal axis 18 therefore effect via the slide element 68 and the helical groove 65 a linear displacement of blocking element 13" in the direction of longitudinal axis 18. Therewith, in turn, the linear displacement of blocking element 13" or of blocking pin 71 from the blocking position into the opening position, and conversely, is possible. In this embodiment the cylindrical structural part 64 on the driven end of the shaft 15 forms the first portion of helical drive unit 16. The second portion of helical drive unit 16 is formed by slide element 68 fastened on end portion 66. The end portion 66, and therewith the slide element 68, is therein fixedly connected with blocking element 13".

What is claimed is:

1. Blocking device for a cylinder lock (1) with a stator (9), a rotor (10) rotatable in this stator (9) by means of a key (2), an additional blocking element (13) engagable and disengagable linearly along a displacement axis in the rotor (10), and an electrically driven control means (14) for actuating this blocking element (13), with the control means (14) comprising a rotating driven end of a shaft (15), a helical drive unit (16) disposed between the control means (14) and the blocking element (13), as well as an electronic control device (17) for generating control signals for the control means (14), characterized in that the driven end of the shaft (15) of the control means (14), the rotational axis of helical drive unit (16) as well as the blocking element (13; 13'; 13") and its linear guidance (20) are disposed on a common longitudinal axis (18), a first portion of the helical drive unit (16) is equipped with a helical groove (39; 61; 65), with this helical groove (39; 61; 65) being disposed on a shell surface about the common longitudinal axis (18), the helical groove (39; 61; 65) having in the direction of the longitudinal axis (18) a span of limited length and with predetermined positive pitch (52), with an end region (46, 45) of the groove (39; 61; 65) being assigned to the blocking position of the blocking element (13; 13'; 13") and the other end region (45, 46) of the groove (39; 61; 65) to the opening position of blocking element (13; 13'; 13") on at least the end region (46, 45) assigned to the blocking position, of the helical groove (39; 61; 65) a longitudinal element (47, 48) of the groove (39; 61; 65) is disposed which does not have a pitch, both ends of groove (39; 61; 65) are terminated with stop faces (40, 41), a second portion of the helical drive unit (16) has a slide element (43; 58; 68) extending into the helical groove (39) and a first portion (36; 59) or a second portion (66) of the helical drive unit (16) is fixedly connected with the blocking element (13; 13'; 13").

2. Blocking device as claimed in claim 1, characterized in that on the driven end of the shaft (15) a cylindrical structural part (64) is fastened and into the outer shell surface of this structural part (64) the helical groove (65) is worked, wherein this structural part (64) forms the first portion of the helical drive unit (16), the blocking element (13") comprises an end portion (66) with an inner bore (67), the cylindrical structural part (64) on the driven end of the shaft (15) extends into this inner bore (67), between this inner bore (67) and the outer shell of the cylindrical structural part (64) a slide guidance is formed and at the end portion (66) which forms the second portion of the helical drive unit (16), the slide element (68) is disposed, with this slide element (68) radially projecting into the bore (67) and extending into the helical groove (65) on the outer shell of the cylindrical structural part (64).

3. Blocking device as claimed in claim 1, characterized in that the blocking element (13') comprises an end portion (59) with an inner bore (60), into the shell surface of this bore (60) the helical groove (61) is formed, with this end portion (59) forming the first portion of the helical drive unit (16), the driven end of the shaft (15) extending into this inner bore (60), between this inner bore (60) and the outer shell of the driven end of the shaft (15) a slide guidance is formed and on the driven end of the shaft (15), which forms the second portion of the helical drive unit (16), the slide element (58) is disposed, with this slide element (58) projecting radially outwardly and extending into the helical groove (61) in the bore (60) on the end portion of the blocking element (13').

4. Blocking device as claimed in claim 1, characterized in that the blocking element (13) has an end portion (36) with a core bore (37), in this core bore (37) outer elements (34) of a slide groove joint are disposed, the driven end of the shaft (15) or a coupling member (32) connected with the driven end of the shaft (15) has inner elements (33) of a slide groove joint and extends into this core bore (37), with the outer elements (34) and the inner elements (33) of this slide groove joint cooperating with one another such that the blocking element (13) is displaceable with respect to the driven end of the shaft (15) in the direction of the longitudinal axis, on the outer shell (38) of the end portion (36) of the blocking element (13) the helical groove (39) is worked in, with this end portion (36) forming the first portion of the helical drive unit (16), this end portion (36) is slidingly guided in a stationary sleeve (42), on the inner shell of this sleeve (42), which forms a component of the second portion of the helical drive unit (16), the slide element (43) is disposed, and this slide element (43) projects radially into the bore (44) of the sleeve (42) and extends into the helical groove (39) on the outer shell (38) of the end portion (36) of the blocking element (13).

5. Blocking device as claimed in claim 1, characterized in that at least one end region (45, 46) of the groove (39; 61; 65) with positive pitch or at one longitudinal element (47, 48) of the groove (39; 61; 65) without pitch is adjoined by an additional longitudinal element (55) of the groove (39) with negative pitch (56).

6. Blocking device as claimed in claim 1, characterized in that the blocking element (13; 13'; 13") has a front portion in the form of a blocking pin (71) and this blocking pin (71) in the blocking position of the cylinder lock (1) extends into an approximately radial bore (19) on the rotor (10).

7. Blocking device as claimed in claim 1, characterized in that in the blocking position of the cylinder lock (1) the slide element (43; 58; 68) is positioned in one of the longitudinal elements (47, 48, 55) of the groove (39; 61; 65), which does not have a positive pitch and is disposed on that end region (45, 46) of the groove (39; 61; 65) which is assigned to the blocking position of the blocking element (13; 13' 13").

8. Blocking device as claimed in claim 1, characterized in that the blocking element (13; 13', 13") is displaceable in the direction of the longitudinal axis (18) from a blocking position into an opening position, and conversely, and the length of the displacement travel between the blocking position and the opening position corresponds to the stroke travel (57) of the helical groove (39; 61; 65) on the helical drive unit (16).

9. Blocking device as claimed in claim 1, characterized in that the electrically driven control means (14) and the helical drive unit (16) are disposed in the region of a crosspiece (3) of the cylinder lock (1) and the longitudinal axis (18) is directed approximately radially with respect to the rotational axis (30) of the rotor (10).

10. Blocking device as claimed in claim 1, characterized in that the blocking element (13; 13', 13") in the blocking and opening position is held form-fittingly and in the direction of the longitudinal axis (18) free of additional holding or resetting forces.

11. Blocking device as claimed in claim 1, characterized in that a portion of the blocking element (13; 13', 13"), the helical drive unit (16), the driven end of the shaft (15) and at least a portion of the control means (14) are encompassed by a housing (21) and with these elements (13, 16, 15, 14) and this housing (21) an electromechanical installation unit (22) is formed.

12. Method for operating the blocking device according to claim 1, characterized in that a control signal of the electronic control device (17) activates the control means (14) and thereby its driven end of the shaft (15) is set into rotation, through the rotating driven end of the shaft (15) the helical drive unit (16) is set into rotation, by means of the helical drive unit (16) the rotating motion of the driven end of the shaft (15) is directly converted into a linear motion of the blocking element (13; 13'; 13"), through this linear motion the blocking element (13; 13'; 13") is displaced in the direction of the longitudinal axis (18) from a blocking position into an opening position or conversely and engages or disengages the rotor (10) and onto the blocking element (13; 13'; 13") during the displacement process and in the blocking and opening positions, no additional holding and or resetting forces are exerted.

13. Method as claimed in claim 12, characterized in that the rotation motion of the driven end of the shaft (15) is stopped with the aid of end stops (40, 41) on the helical drive unit (16), the control device (17) detects the stand-still of the driven end of the shaft (15) and thus of the control means (14) and, after the passage of a predetermined control time, the energy supply to the control means (14) is interrupted.

14. Method as claimed in claim 12, characterized in that the control device (17) is activated through information signals, which are transmitted directly via contact elements (28) or via a contact-free transmitter/receiver system from a mobile information medium (2, 25) to the control device (17) of the cylinder lock (1).

15. Method as claimed in claim 12, characterized in that the control means (14) during the active time is intermittently supplied with energy.

* * * * *